June 26, 1928.  1,675,028
J. A. HEDBERG
ANIMAL TRAP
Original Filed July 29, 1922
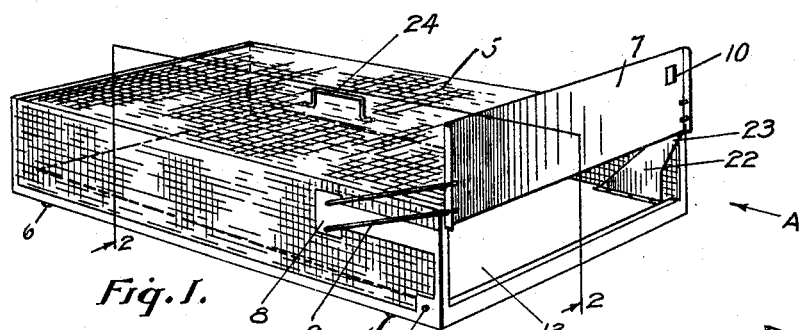
Fig. 1.
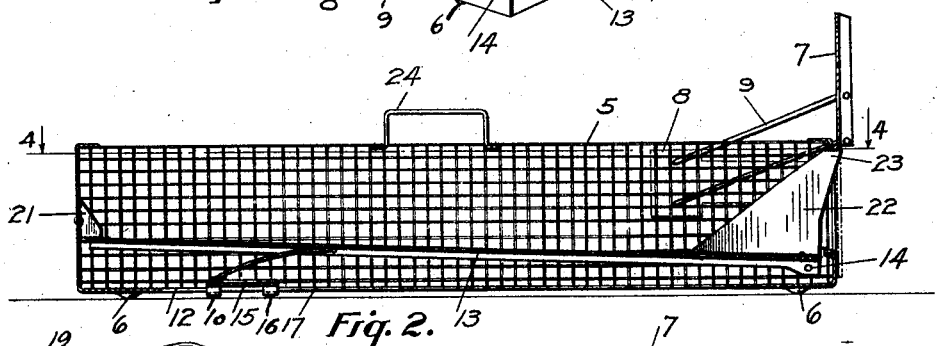
Fig. 2.
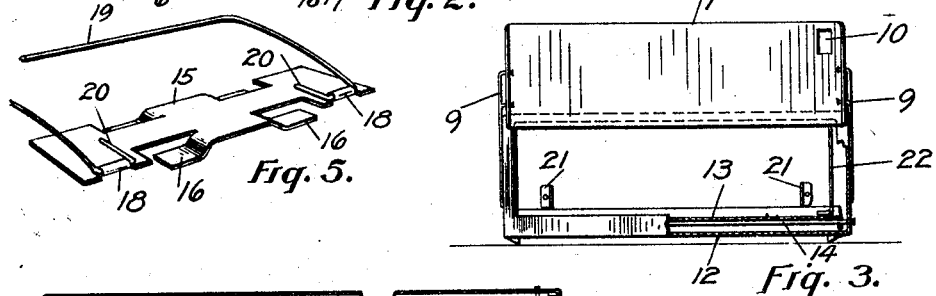
Fig. 5.
Fig. 3.
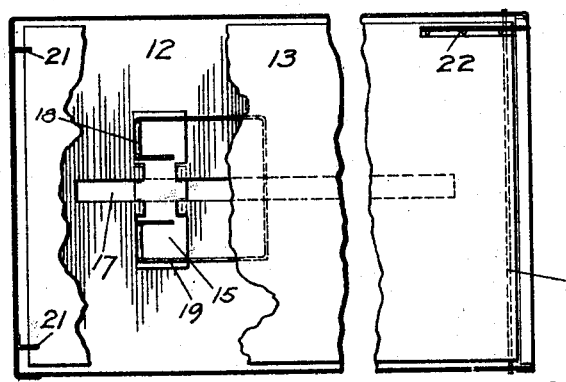
Fig. 4.
INVENTOR.
J. A. Hedberg
BY
ATTORNEY.

Patented June 26, 1928.

1,675,028

UNITED STATES PATENT OFFICE.

JOHN A. HEDBERG, OF DENVER, COLORADO, ASSIGNOR TO THE SPRING FLOOR TRAP & MANUFACTURING COMPANY, OF DENVER, COLORADO, A CORPORATION OF COLORADO.

ANIMAL TRAP.

Application filed July 29, 1922, Serial No. 578,329. Renewed November 22, 1927.

My invention relates to animal traps and more particularly to certain new and useful improvements in traps of the type in which the weight of animals attracted by a bait causes an adjusted gate to move to a closing position with relation to the opening through which the animals entered.

It is an object of the present invention to provide a trap of the above described character in which the element which is actuated by the weight of the animals, consists of a depressible floor which controls the movement of a gate or door adapted to close the entrance to the trap.

Another object is to provide an adjustable means to vary the yielding resistance of the movable element to the actuative influence of the weight to which it is subjected, and thereby adapt the device to entrap a number of animals of a predetermined aggregate weight at one time and in one and the same receptacle, and still other objects reside in details of construction and a novel arrangement of parts as will hereinafter be described with reference to the accompanying drawing.

In the drawing in the various views of which corresponding parts are designated by similar characters of reference, Figure 1 represents a perspective view of my improved animal trap with its door or gate in the raised position;

Figure 2, an enlarged longitudinal section taken on a vertical plane designated by the line 2—2 in Figure 1;

Figure 3, a partially sectional front view of the trap, looking in the direction of the arrow A in Figure 1;

Figure 4, an enlarged fragmentary horizontal section taken on the line 4—4, Figure 2; and Figure 5, a perspective view of the adjustable resilient support for the depressible floor of the trap.

Referring to the drawings, the reference character 5 designates a cage made of wire screening or other perforated material which at the lower edges of its longitudinal sides has four or more knobs 6 for its support upon a floor or other surface.

The cage is open at its front end and its opening is normally closed by an upwardly moving gate 7 which is pivotally mounted on reenforcing plates 8 at opposite sides of the cage, through the medium of two pairs of pivoted parallel arms 9.

The gate is preferably made of sheet metal and it is flanged at its ends for rigidity as well as to provide a convenient means for the pivotal connection of the arms.

An opening 10 in the gate co-operates with a catch on the floor or platform hereinafter to be described, to lock the gate in its closed position.

The parallel arms 9 are at one end pivoted on the cage adjacent the top thereof and they are at their opposite end pivoted on the gate at the lower end thereof and by this arrangement of the arms, the gate is maintained in a vertical position in its up and downward movements and is firmly held in its closed position so as to prevent its being lifted by the animals in the trap.

The cage has a fixed bottom 12 and above the same, a false floor or platform 13 which is pivoted at the front end of the cage upon a rod 14 extending transversely between the sides thereof. The platform is composed of a metal sheet which is flanged at its longitudinal edges and it is supported upon a spring on a slide which is mounted for adjustment lengthwise of the bottom of the cage.

The slide as best shown in Figure 5 of the drawings, consists of a metal strip 15 having downwardly offset flanges 16 which are inserted through a central longitudinal slot 17 of the bottom of the cage to engage with the underside of the same.

The strip being thus mounted to slide lengthwise of the fixed bottom of the receptacle, has two loops 18 for the pivotal connection of the ends of the before mentioned spring 19 which is preferably made in U-shaped form.

The end-portions 20 of the spring are bent angularly to its shanks which occupy the loops of the slide, and by engagement with the upper surface of the slide, compel the upwardly slanting body portion of the spring to yieldingly engage with the under surface of the pivoted platform which is limited in its upward movement by a pair of stops 21 at the rear end of the cage.

The platform carries at its front end an upwardly extending catch consisting of a relatively fixed plate 22 which at its upper end projects forwardly of the edge of the platform to provide a nose 23 which by engagement with the lower edge of the lifted gate supports it in the raised position, as shown in Figure 2 of the drawings.

The before mentioned opening 10 of the gate is in line with the nose of the catch so that when the gate is in its closed position, the nose will enter the opening and thereby lock the gate against being lifted by the animals entrapped in the cage.

A bail or handle 24 at the top of the cage provides a convenient means for its removal and manipulation after the animals are caught.

Having thus described the construction of my improved trap, it will be evident that it is particularly adapted for catching rats, mice and other rodents. The trap is set by raising its gate in the manner illustrated in the drawings and placing a suitable bait on the pivoted spring-supported platform.

It will be understood that when the weight of one or more animals which, attracted by the bait, enters the cage at the open end thereof, is sufficient to depress the pivoted platform against the yielding resistance of the spring, the downward movement of the platform will cause its catch to be withdrawn from the door with the result that the latter descends by the force of gravity and closes the entrance to the receptacle.

By adjustment of the slide lengthwise of the fixed bottom of the cage, the spring is moved toward or from the pivotal axis of the platform and the weight required to actuate the latter can in consequence be determined.

By these means, the trap can be adapted to catch different kinds of animals, irrespective of their individual weight or to catch one or any number of animals within the capacity of the receptacle, as may be desired.

I desire it understood that the yielding support for the platform may be arranged in different ways according to the size, form and construction of the trap and that other variations in the form and arrangement of the parts of the trap may be made within the scope of my invention as defined in the hereunto appended claims.

What I claim and desire to secure by Letters Patent is:

1. An animal trap comprising a cage having an entrance opening, a depressible platform in the cage, a gate adapted to close the opening, and a catch on the platform having a nose adapted to engage with the gate to support it in a raised position, and to release the same when the platform is depressed by the weight of an animal that entered through the opening, the gate having an opening co-operative with the catch to lock the gate in its closed position.

2. An animal trap comprising a cage having a bottom and an entrance opening, a slide adjustable lengthwise of said bottom, a spring on the slide, a pivoted platform supported on the spring, a gate to close the opening, and means to hold the gate in the open position and to release the same when the platform is depressed by the weight of an animal that enters through the opening.

3. An animal trap comprising a cage having a slotted bottom and an entrance opening, a slide movable in said slot, a spring on the slide, a pivoted platform supported on the spring, a gate to close the opening, and means to hold the gate in the open position and to release the same when the platform is depressed by the weight of an animal that enters through the opening.

4. An animal trap comprising a cage having an entrance opening, a downwardly movable gate adapted to close said opening, arms pivoted on the cage, in pivotal connection with the gate at opposite sides thereof, and adapted to maintain the gate in a substantially vertical position in its up and downward movements, a depressible platform in the cage, and means to hold the gate in its raised position and to release the same when the platform is depressed by the weight of an animal that entered through the opening.

5. An animal trap comprising a cage having an entrance opening, an upwardly and downwardly moving gate adapted to close said opening, and parallel arms which maintain the gate in a substantially vertical position in its upward and downward movements and firmly hold the same in its closed position, the ends of the arms being pivoted at a portion of the cage opposite the upper portion of the gate in its closed position, and at the lower portion of the gate.

6. An animal trap comprising a cage having an entrance opening, a pivoted platform, a spring supporting the platform, said spring being mounted for adjustment to vary its distance from the pivotal axis of the platform, a gate to close the opening, and means to hold the gate in the open position and to release the same when the platform is depressed against the resistance of the spring by the weight of an animal that entered through the opening.

In testimony whereof I have affixed my signature.

JOHN A. HEDBERG.